US011755930B2

United States Patent
Seo et al.

(10) Patent No.: US 11,755,930 B2
(45) Date of Patent: Sep. 12, 2023

(54) METHOD AND APPARATUS FOR CONTROLLING LEARNING OF MODEL FOR ESTIMATING INTENTION OF INPUT UTTERANCE

(71) Applicant: KAKAO CORP., Jeju-si (KR)

(72) Inventors: Seung Won Seo, Seongnam-si (KR); Tae Uk Kim, Seongnam-si (KR); Il Nam Park, Seongnam-si (KR); Myeong Cheol Shin, Seongnam-si (KR); Hye Ryeon Lee, Seongnam-si (KR); Sung Eun Choi, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 508 days.

(21) Appl. No.: 15/930,441

(22) Filed: May 13, 2020

(65) Prior Publication Data

US 2020/0380382 A1    Dec. 3, 2020

(30) Foreign Application Priority Data

May 29, 2019   (KR) ........................ 10-2019-0063029

(51) Int. Cl.
| | |
|---|---|
| G06N 5/04 | (2023.01) |
| H04L 51/046 | (2022.01) |
| H04L 51/02 | (2022.01) |
| G10L 15/06 | (2013.01) |

(52) U.S. Cl.
CPC .............. *G06N 5/04* (2013.01); *G10L 15/063* (2013.01); *H04L 51/02* (2013.01); *H04L 51/046* (2013.01); *G10L 2015/0638* (2013.01)

(58) Field of Classification Search
USPC .............................................. 704/9, 255–257
See application file for complete search history.

(56) References Cited

U.S. PATENT DOCUMENTS

| | | | |
|---|---|---|---|
| 2006/0080098 A1* | 4/2006 | Campbell | G10L 13/027 704/243 |
| 2018/0174578 A1* | 6/2018 | Bangalore | G06F 40/137 |
| 2020/0175117 A1* | 6/2020 | Tsuji | G06N 5/04 |
| 2020/0251091 A1* | 8/2020 | Zhao | G10L 15/26 |

FOREIGN PATENT DOCUMENTS

| | | |
|---|---|---|
| JP | 200544103 A | 2/2005 |
| JP | 200846318 A | 2/2008 |
| KR | 1020100111164 A | 10/2010 |

* cited by examiner

*Primary Examiner* — Leonard Saint-Cyr
(74) *Attorney, Agent, or Firm* — CANTOR COLBURN LLP (57) ABSTRACT

A method and apparatus for controlling learning of a model for estimating an intention of an input utterance is disclosed. A method of controlling learning of a model for estimating an intention of an input utterance among a plurality of intentions includes providing a first index corresponding to the number of registered utterances for each intention, providing a second index corresponding to a learning level for each intention, providing a learning target setting interface such that at least one intention that is to be a learning target is selected from among the intentions based on the first index and the second index, and training the model based on the registered utterances for each intention and setting of the learning target for each intention.

18 Claims, 9 Drawing Sheets

Additional management of utterances for 'block name' learning  ✕
Current learning level: learning unavailable Learning available: 20    Recommended inputs: 100

[Input uttered sentence]    [Input]

No input utterance for learning

*Added utterances can be verified only in this pop-up.

Additional upload    Store

520

Additional management of utterances for 'block name' learning  ✕
Current learning level: ●

Learning available: 20    Recommended inputs: 100

[Input uttered sentence]    [Input]

Play IU's song for me
Listen to IU's song
Let's listen to IU's song
IU's song, cue!
Play IU's song
Play IU's song for me
Listen to IU's song

*Added utterances can be verified only in this pop-up.

Additional upload    Store

530

Additional management of utterances for 'block name' learning  ✕
Current learning level: ●

Learning available: 20    Recommended inputs: 100

[Input uttered sentence]    [Input]

Play IU's song for me
Listen to IU's song
Let's listen to IU's song
IU's song, cue!
Play IU's song
Play IU's song for me
Listen to IU's song
Let's listen to IU's song
IU's song, cue!
Play IU's song
Play IU's song for me
Listen to IU's song
Let's listen to IU's song
Play IU's song for me
Play IU's song for me
Listen to IU's song

*Added utterances can be verified only in this pop-up.

Additional upload    Learn after store

METHOD AND APPARATUS FOR CONTROLLING LEARNING OF MODEL FOR ESTIMATING INTENTION OF INPUT UTTERANCE

CROSS-REFERENCE TO RELATED APPLICATIONS

This application claims the benefit under 35 USC § 119(a) of Korean Patent Application No. 10-2019-0063029 filed on May 29, 2019, in the Korean Intellectual Property Office, the entire disclosure of which is incorporated herein by reference for all purposes.

BACKGROUND

1. Field

The following description relates to a method and apparatus for controlling learning of a model for estimating an intention of an input utterance.

2. Description of Related Art

Recently, a technology for interacting with artificial intelligence (AI)-based software is being developed. A user may communicate with such software provided in a messenger, a smart speaker, or the like. The software is generally referred to as a bot, and the software provided in a messenger is generally referred to as a chatbot or a chatting bot. To enhance the ability of a bot to communicate, AI technology may be combined. With the development of AI-related technologies, various types of bot including, for example, a bot in which AI is combined on a messenger platform and a bot in which AI is combined on a speech recognition platform, are being introduced.

There is also a growing number of entities or enterprises that provide various functions using an open application programming interface (API) in a messaging service field, a social networking service (SNS) field, or the like. However, a method of producing a bot using such an API may not be easy to general users who are not programming specialists, and thus a user who desires to produce a customized bot may experience inconvenience because he/she needs to request some specialized producers to produce the customized bot.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a method that enables general users who are not programming specialists to construct a machine learning model for estimating an intention of an input utterance.

The method may provide, for each intention unit, a learning state of the machine learning model for estimating an intention of an input utterance.

The method may verify a learning level of the machine learning model for each intention unit using a visualized index, thereby enabling decision making such as additional learning or ignoring based on a result of the verifying.

Another aspect provides a platform that allows an administrator to be involved in decision making for learning of a machine learning model to generate a customized bot.

According to an example embodiment, there is provided a method of controlling learning of a model for estimating an intention of an input utterance among a plurality of intentions, the method including providing a first index corresponding to the number of registered utterances for each intention, providing a second index corresponding to a learning level for each intention, providing a learning target setting interface such that at least one intention that is to be a learning target is selected from among the intentions based on the first index and the second index, and training the model based on the registered utterances for each intention and setting of the learning target for each intention.

The method may further include providing an interface for invoking an interface for inputting the registered utterances for each intention.

The providing of the first index may include dynamically updating the first index in response to the registered utterances for each intention being input.

The providing of the first index may include determining whether the number of the registered utterances for each intention is greater than or equal to a threshold value, and providing the first index corresponding to a result of the determining.

The method may further include classifying the registered utterances for each intention into a first registered utterance for learning and a second registered utterance for evaluation.

The training may include training the model based on the first registered utterance and the setting of the learning target for each intention.

The providing of the second index may include evaluating the model based on the second registered utterance, and providing the second index based on a result of the evaluating.

The evaluating of the model may include determining whether an intention corresponding to the second registered utterance is output after the second registered utterance is input to the model.

The training may include training the model through a supervised learning method.

The registered utterances may include at least one of a patterned registered utterance including a combination of previously tagged unit words or an irregularly registered utterance not including the tagged unit words.

According to another example embodiment, there is provided a method of controlling, for each intention unit, learning of a model for estimating an intention of an input utterance among a plurality of intentions, the method including receiving an input of one or more utterances to be registered for an intention that is a control target to be controlled, providing a first index corresponding to the number of the utterances registered for the intention that is the control target, providing a second index corresponding to a learning level of the intention that is the control target, activating an interface for learning the intention that is the control target based on at least one of the first index or the second index, and training the model based on the registered utterances in response to the activated interface being selected.

In response to the number of the registered utterances being greater than or equal to a threshold value, the activating may include activating the interface.

According to still another example embodiment, there is provided an apparatus for controlling learning of a model for estimating of an intention of an input utterance among a plurality of intentions, the apparatus including a processor. The processor may provide a first index corresponding to the number of registered utterances for each intention, provide a second index corresponding to a learning level for each intention, provide a learning target setting interface such that at least one intention that is to be a learning target is selected from among the intentions based on the first index and the second index, and train the model based on the registered utterances for each intention and setting of the learning target for each intention.

The processor may provide an interface for invoking an interface for inputting the registered utterances for each intention.

The processor may dynamically update the first index, in response to the registered utterances for each intention being input.

The processor may determine whether the number of the registered utterances for each intention is greater than or equal to a threshold value, and provide the first index corresponding to a result of the determining.

The processor may classify the registered utterances for each intention into a first registered utterance for learning and a second registered utterance for evaluation.

The processor may train the model based on the first registered utterance and the setting of the learning target for each intention.

The processor may evaluate the model based on the second registered utterance, and provide the second index based on a result of the evaluating.

The processor may determine whether an intention corresponding to the second registered utterance is output after the second registered utterance is input to the model.

According to yet another example embodiment, there is provided an apparatus for controlling, for each intention unit, learning of a model for estimating an intention of an input utterance among a plurality of intentions, the apparatus including a processor. The processor may receive an input of one or more utterances to be registered for an intention that is a control target to be controlled, provide a first index corresponding to the number of the utterances registered for the intention that is the control target, provide a second index corresponding to a learning level of the intention that is the control target, activate an interface for learning the intention that is the control target based on at least one of the first index or the second index, and train the model based on the registered utterances in response to the activated interface being selected.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout this disclosure, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The following example embodiments may be embodied in various forms of products, for example, a personal computer (PC), a laptop computer, a tablet PC, a smartphone, a television (TV), a smart home appliance, an intelligent vehicle, a kiosk, and a wearable device. Hereinafter, examples will be described in detail with reference to the accompanying drawings, and like reference numerals in the drawings refer to like elements throughout.

Figure 1:
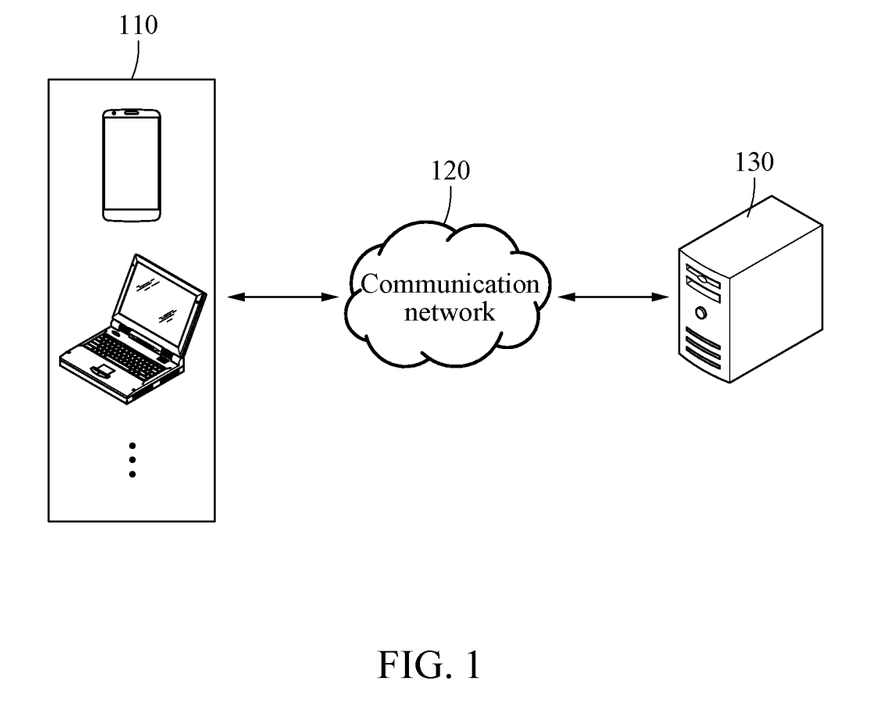
FIG. 1 is a diagram illustrating an example of a network system according to an example embodiment.

FIG. 1 is a diagram illustrating an example of a network system according to an example embodiment.

Referring to FIG. 1, a network system includes a user terminal 110 and a server 130 that communicate with each other through a communication network 120. However, a user terminal and a server are not limited to the user terminal 110 and the server 130 illustrated in FIG. 1.

The communication network 120 may include a communication method using a communication network (e.g., mobile communication network, wired Internet, wireless Internet, and broadcast network) that is included in a network, and also a near-field communication method used among devices. For example, the network may include at least one of a personal area network (PAN), a local area network (LAN), a campus area network (CAN), a metropolitan area network (MAN), a wide area network (WAN), a broadband network (BBN), or the Internet. In addition, the network may include at least one network topology including, for example, a bus network, a star network, a ring network, a mesh network, a star-bus network, a tree or hierarchical network, or the like. However, the network is not limited to the foregoing examples.

The user terminal 110 may be a device that receives an instruction from a user and performs an operation corresponding to the received instruction, and be a digital device including a wired and/or wireless communication function or other functions. According to an example, the user terminal 110 may include all types of digital device that has a computational capability with a memory and a microprocessor provided therein, and the digital device may include, for example, a PC, a laptop computer, a tablet PC, a smartphone, a smart TV, a mobile phone, a navigation device, a webpad, a personal digital assistant (PDA), a workstation, and the like.

The user terminal 110 may provide the user with an interface. The interface may be provided by the user terminal 110 itself. For example, the interface may be provided by an operating system (OS) of the user terminal 110, or by an application installed in the user terminal 110. In addition, the interface may be provided by the server 130, and the user terminal 110 may simply display the interface received from the server 130.

Hereinafter, examples of controlling learning of a machine learning model of an artificial intelligence (AI)-based chatbot will be described in relation to a scenario in which the chatbot is provided in an instant messaging service for the convenience of description. The examples to be described hereinafter may also be applied to various fields, for example, a scenario in which such an AI-based bot is provided through a smart speaker.

Although to be described in detail hereinafter, the server 130 may provide a model for extracting a user intention from a message input by the user.

The model may include an AI model, such as a machine learning model, that performs prediction or classification based on features that are learned through learning or training data. The term "utterance" used herein may refer to input data, and include an input utterance and a registered utterance. The input utterance may refer to an utterance that is actually input by the user for estimation of an intention of the utterance. For example, the input utterance may include a message input by the user in a chat room in which a chatbot participates. The registered utterance may refer to an utterance used as input data for the model in a learning process.

In addition, the term "intention" used herein may include a general intention connoted in an input utterance of the user, and a detailed intention in which knowledge of areas associated with the contents of the input utterance is added to the general intention. For example, an input utterance "the sound is too small" may connote an intention indicating "turn up the volume." To construct the model for extracting an intention of an utterance of a user, an intention suitable for each area in which the model is to be used or for a response type may need to be defined. Hereinafter, a block may be used as a basic unit for controlling various user intentions for each intention.

According to an example embodiment, the server 130 may provide a learning level of the model for each intention unit through visual indices, and the user may verify an overall learning state. For example, the server 130 may provide the user with a learning level of an intention indicating "turn up the volume" in an intuitive form such as, for example, low/intermediate/high. In this example, the user may control the learning process of the machine learning model such that learning is selectively performed on only intentions that have not been learned or have insufficiently learned.

Figure 2:
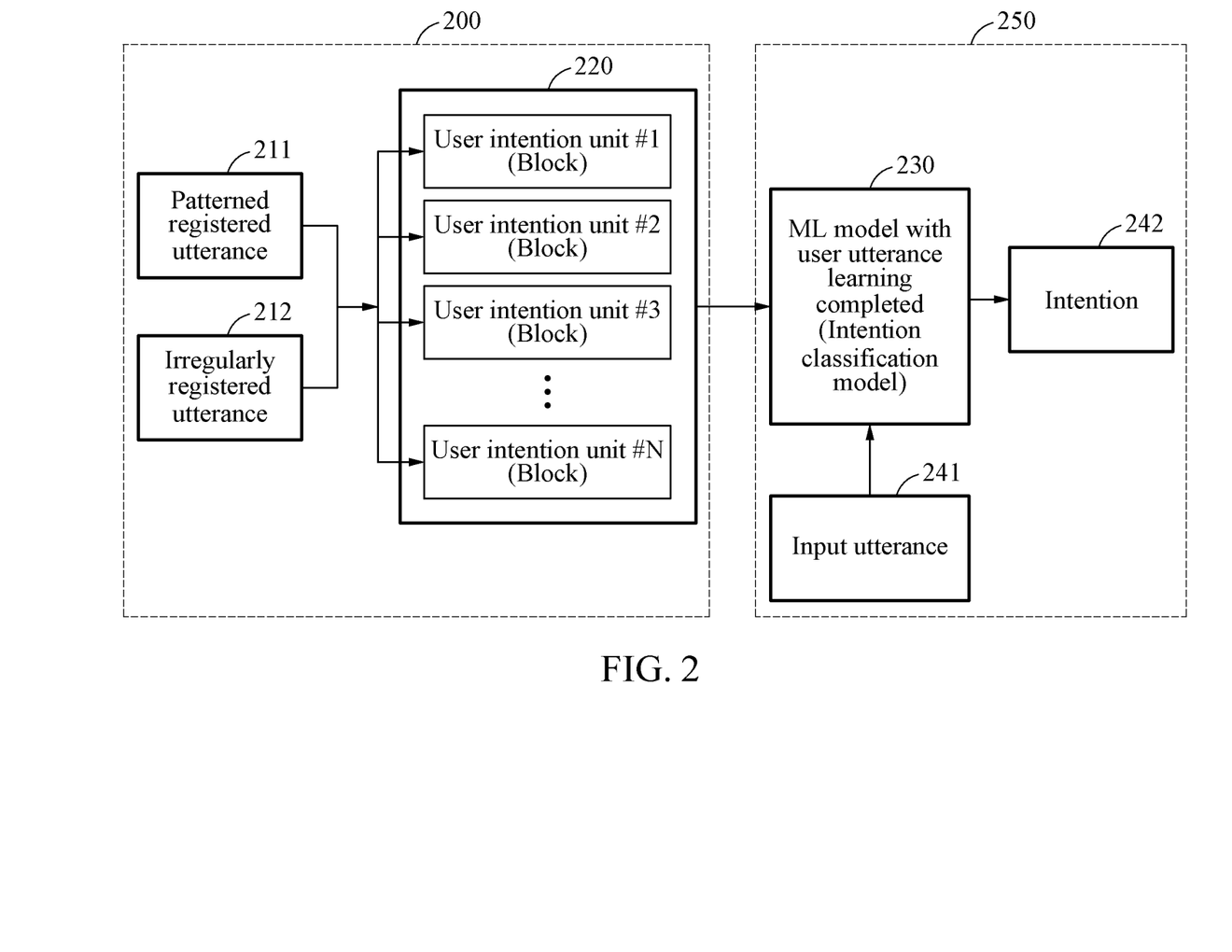
FIG. 2 is a diagram illustrating an example of estimating an intention of an input utterance according to an example embodiment.

FIG. 2 is a diagram illustrating an example of estimating an intention of an input utterance according to an example embodiment.

Referring to FIG. 2, a method of estimating an intention of an input utterance may include a learning process 200 and an estimation process 250.

A registered utterance may include a patterned registered utterance 211 and an irregularly registered utterance 212. The patterned registered utterance 211 may indicate a sentence or sequence of tagged unit words that are combined in a certain form. The irregularly registered utterance 212 may indicate a sentence input by a user in an irregular form or a sequence of words input in an irregular form, irrespective of tagging of unit words. Herein, a unit word may refer to a representative keyword in an utterance of the user that is used to define a user intention of the utterance. According to an example embodiment, unit word tagging may be performed by registering a semantic type corresponding to a certain meaning, at least one unit word indicating the meaning of the semantic type, and a synonym of the unit word. The unit word tagging may be performed by the user. Alternatively, in the case of intentions of standard semantic type, it may be provided to the user in a form that the tagging is completed in advance.

The learning process 200 may be performed on a platform provided by a server. The user may input a preset number or more of registered utterances corresponding to each of intentions to be estimated, and allow a model 220 for estimating an intention of an utterance to perform learning for each intention.

In detail, in the learning process 200, the server may provide a registered utterance inputting interface for each intention unit, and the user may input a preset number or more of registered utterances corresponding to each intention through a user terminal. When the server receives the preset number or more of the registered utterances corresponding to each intention from the user, the server may train the model 220. The model 220 may be a machine learning model that performs machine learning. The model 220 may perform the machine learning through a supervised learning method. Each intention, the patterned registered utterance 211, and the irregularly registered utterance 212 may be used as learning or data of the model 220. The learning data may include a pair of input data and output data. According to an example embodiment, a registered utterance may correspond to the input data, and a corresponding intention may correspond to the output data. For example, the user may input registered utterances corresponding to N intentions, and the server may train the model 220 for each intention unit.

For example, it is possible to learn an intention indicating "turn up the volume" through various registered utterances, for example, "turn up the sound," "the sound is small," "raise the volume," and "I cannot hear it well, so it would be great if you turn up the sound."

According to an example embodiment, at least one feature may be extracted from a registered utterance, and be used for learning of the model 220. For example, a feature extracted by analyzing each morpheme of a sentence of a registered utterance, a feature corresponding to tagging information of unit words included in the sentence of the registered utterance, a feature corresponding to a sentence vector extracted from the entire sentence of the registered utterance, or various combinations of the foregoing features may be used for the learning of the model 220.

The tagging information of unit words may include a semantic type of a unit word included in the sentence of the registered utterance. Here, the model 220 may be trained to recognize various unit words belonging to a same semantic type as the unit word, in addition to the unit word.

The estimation process 250 may be performed in a user front channel associated with a platform of the server, for example, a web, an application, a social messenger, and other speech processing hardware devices.

In the estimation process 250, an intention 242 corresponding to an input utterance 241 may be estimated through a model 230 for which the learning is completed. The user may input the input utterance 241, and the model 230 may estimate, as an output in response to the input utterance 241, the intention 242 that is matched with a highest confidence score.

For example, in response to an input utterance "the sound is too small," the model 230 that is already trained may output an intention indicating "turn up the volume" with a highest confidence score among N intentions. In this example, the model 230 may estimate that the input utterance "the sound is too small" corresponds to the intention indicating "turn up the volume."

According to an example embodiment, at least one feature may be estimated from an input utterance, and used for the model 230 to estimate a corresponding intention. For example, a feature extracted by analyzing each morpheme of a sentence of the input utterance, a feature corresponding to tagging information of unit words included in the sentence of the input utterance, a feature corresponding to a sentence vector extracted from the entire sentence of the input utterance, or various combinations of the foregoing features may be used for the model 230 to estimate the intention.

According to an example embodiment, in the estimation process 250, the input utterance 241 input through the user front channel may be transmitted to the server, and the server may operate the model 230 for which the learning is completed. In such a case, the server may provide an estimation result of the model 230 to the user front channel.

Figure 3:
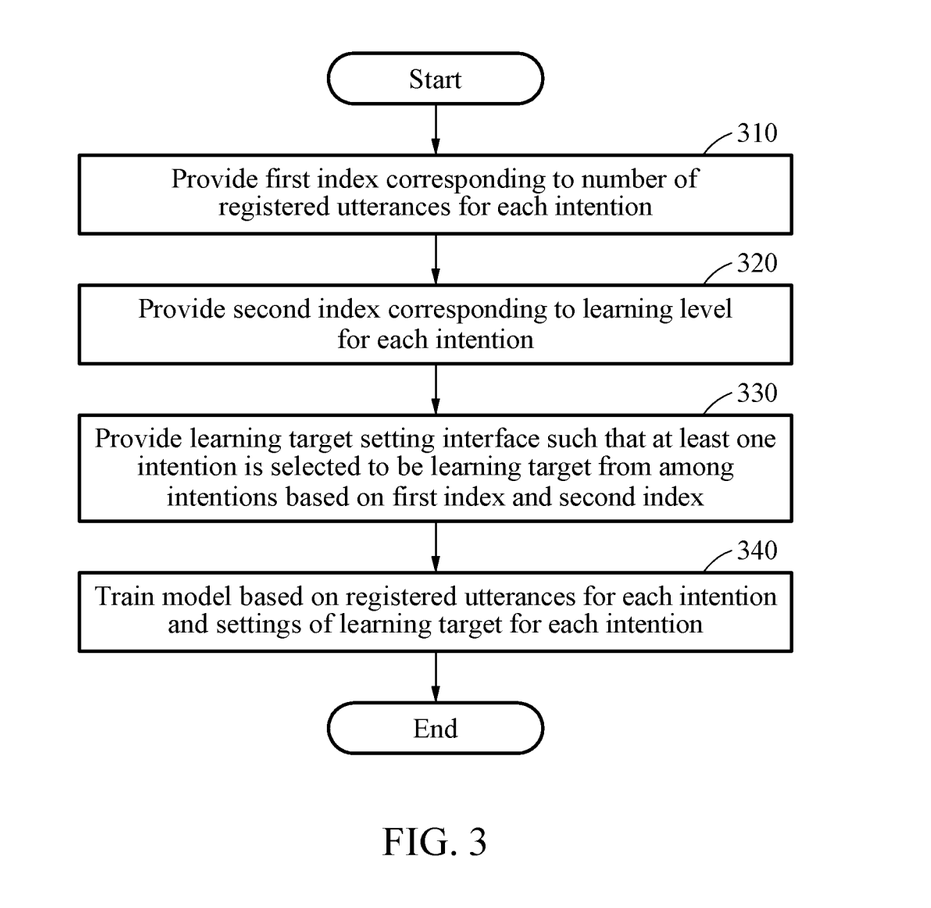
FIG. 3 is a flowchart illustrating an example of a method of controlling learning of a model for estimating an intention of an input utterance among a plurality of intentions according to an example embodiment.

FIG. 3 is a flowchart illustrating an example of a method of controlling learning of a model for estimating an intention of an input utterance among a plurality of intentions according to an example embodiment.

Operations 310 through 340 to be described hereinafter with reference to FIG. 3 may be performed by the server 130 described above with reference to FIG. 1. The server 130 may be embodied by one or more hardware modules, one or more software modules, or various combinations thereof. The server 130 may also be referred to herein as an apparatus for controlling learning of a model, or simply a model learning controlling apparatus.

Referring to FIG. 3, in operation 310, the server 130 provides a first index corresponding to the number of registered utterances for each intention. According to an example embodiment, a user may input a registered utterance for each intention, and thus the number of registered utterances may differ for each intention. The server 130 may provide the first index corresponding to the number of registered utterances for each intention, and thus allow the user to verify an input state of registered utterances corresponding to each intention. Thus, the server 130 may guide the user to adjust the number of registered utterances corresponding to each intention.

In operation 320, the server 130 provides a second index corresponding to a learning level for each intention. When learning is performed at least once, the server 130 may provide a learning level of learning that is most recently performed, using a color, a figure, an icon, or the like for each intention. That is, the server 130 may provide the user with a learning level of machine learning for each intention unit, using visual indices. Based on this, the user may make a decision on whether to perform additional learning or ignore it. Hereinafter, determining a learning level will be described in greater detail with reference to FIG. 5.

In operation 330, the server 130 provides a learning target setting interface such that at least one intention to be a learning target is selected from among a plurality of intentions based on the first index and the second index. Through this, the user may select an intention to be the learning target, and form intentions to be the learning target. For example, the user may set, to be the learning target, only intentions with a low learning level, based on the second index. Alternatively, the user may additionally input a registered utterance for an intention with a smaller number of registered utterances based on the first index, and then set the intention to be the learning target. Here, the learning target may refer to a target to be learned, or a target for which learning is to be performed.

In operation 340, the server 130 trains a model based on the registered utterances for each intention and setting of the learning target for each intention. The server 130 may train the model using registered utterances corresponding to intentions set to be the learning target, only for the intentions.

Figure 4:
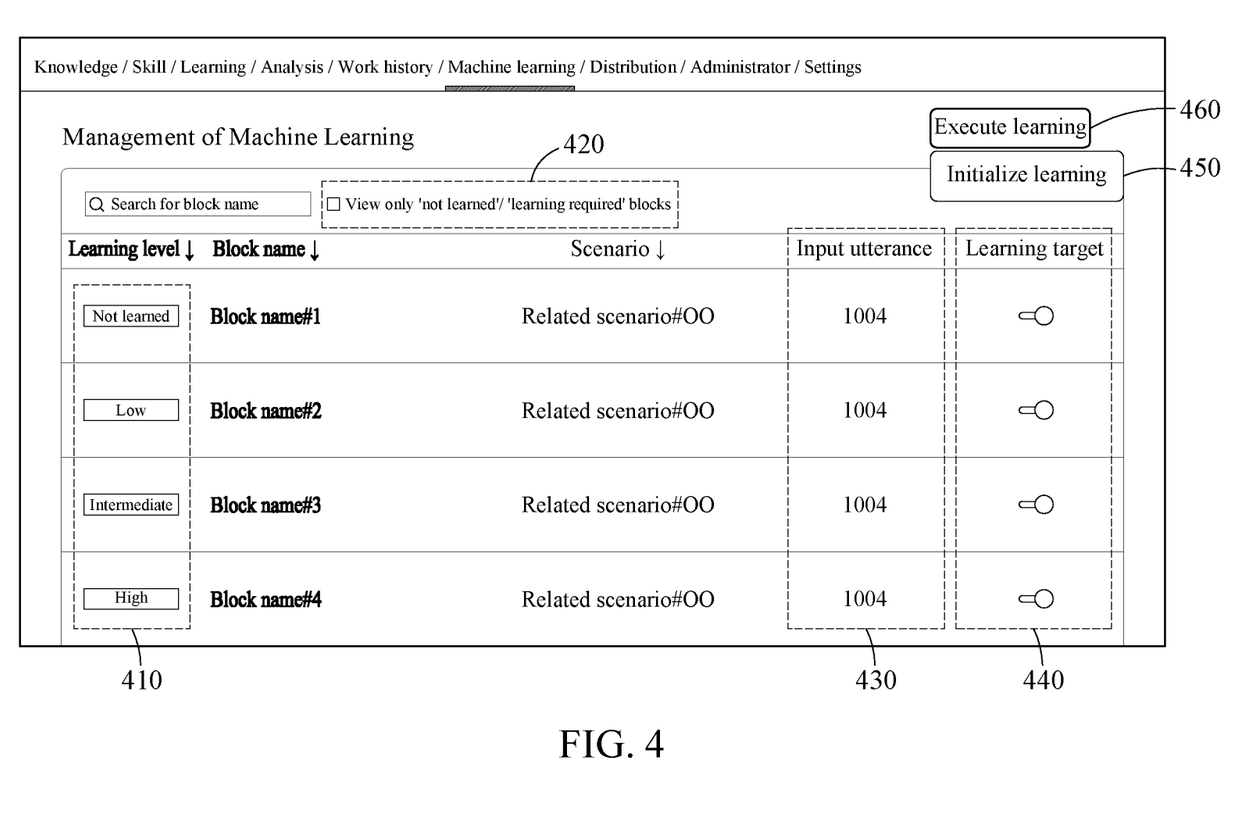
FIG. 4 is a diagram illustrating an example of a screen of a platform that provides a learning information list of a plurality of intentions according to an example embodiment.

FIG. 4 is a diagram illustrating an example of a screen of a platform that provides a learning information list of a plurality of intentions according to an example embodiment.

Referring to FIG. 4, learning information associated with a plurality of intentions may be verified through visual indices on a screen of a platform, and a user may control learning based on the visual indices. A server may provide a learning information list of the intentions. The learning information may include a first index 430 corresponding to the number of registered utterances for each intention, a second index 410 corresponding to a learning level for each intention, and a learning target setting interface 440 for each intention. The learning information may further include an intention name (or block name) and a related scenario.

The first index 430 may be represented by the number of registered utterances input for learning by each intention. Based on this, the user may make a decision on whether additional machine learning is needed or not. Although to be described in detail hereinafter, the registered utterances included in the first index 430 may include a first registered utterance for learning and a second registered utterance for evaluation.

The second index 410 corresponding to the learning level for each intention may be represented by qualitative and visual elements. The second index 410 may be represented by a color, a figure or a shape, an icon, or a combination thereof for each intention. For example, the second index 410 may be represented by one of not learned, low, intermediate, good, and high. Alternatively, the second index 410 may be represented by a color corresponding to each learning level, for example, red corresponding to a learning level indicating not learned, yellow-green corresponding to a learning level indicating low, green corresponding to a learning level indicating intermediate, and dark green corresponding to a learning level indicating high.

Through the learning target setting interface 440 for each intention, the user may select an intention to be a learning target. For example, the learning target setting interface 440 may be provided in a form of an on-off switch. In this example, when the switch corresponding to an intention is in an off state, the intention may be automatically excluded from the learning target.

The server may provide a learning executing interface 460. The user may set an intention that is to be a learning target using the learning target setting interface 440 for each intention, and request learning of intentions that are learning targets by clicking the learning executing interface 460.

The server may provide a learning initializing interface 450. The user may click the learning initializing interface 450 to initialize a learning state of a model for all intentions and reset a learning level.

The server may provide a filtered search interface 420. The user may click the filtered search interface 420 to make a filtered search for only a block requiring machine learning, for example, a block corresponding to a learning level indicating not learned.

The server may provide an interface (not shown) for invoking a registered utterance inputting interface for each intention. The user may then input a registered utterance using the registered utterance inputting interface. The registered utterance inputting interface will be described in detail hereinafter with reference to FIG. 5.

Figure 5:
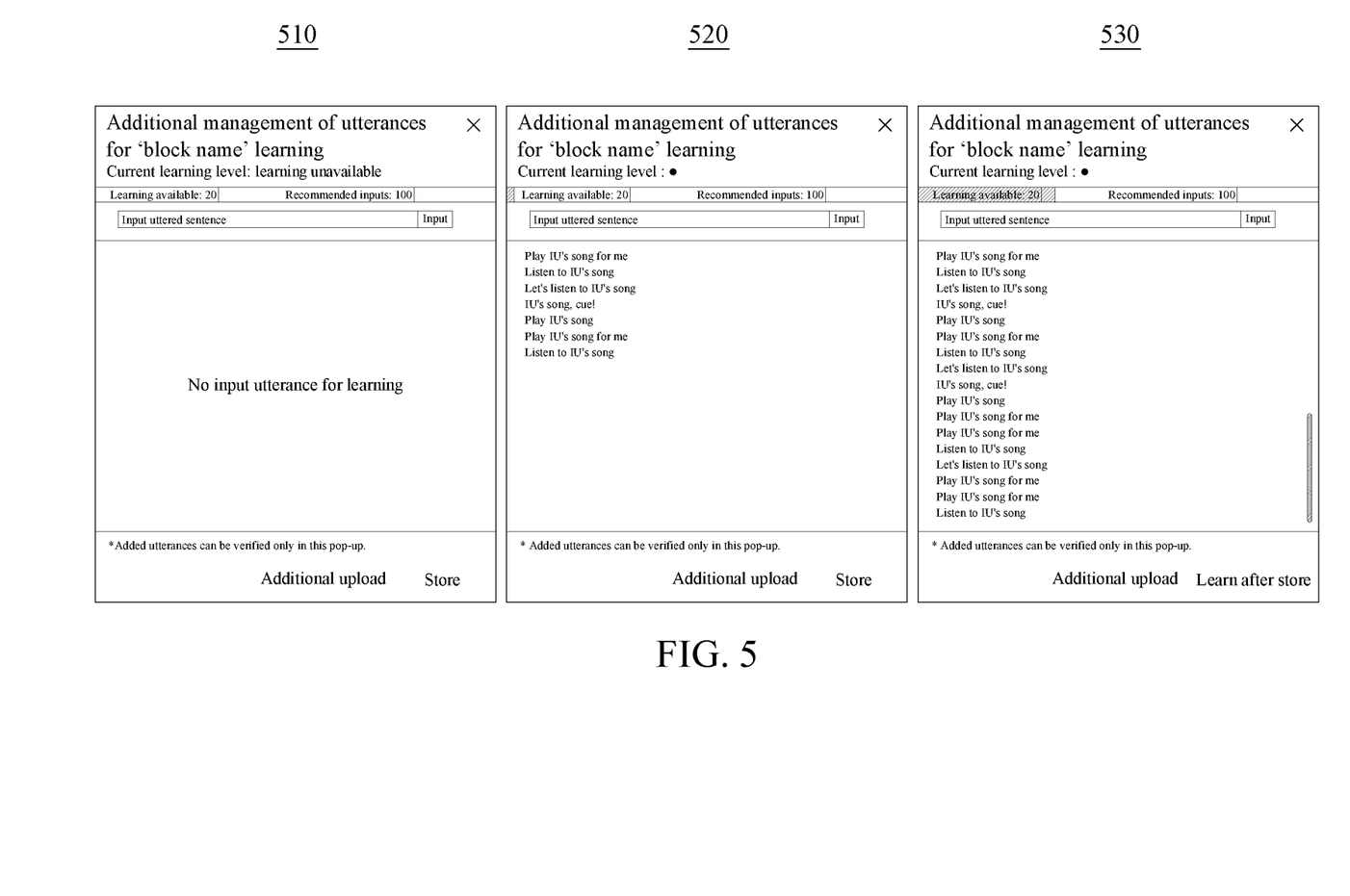
FIG. 5 is a diagram illustrating an example of a registered utterance inputting interface according to an example embodiment.

FIG. 5 is a diagram illustrating an example of a registered utterance inputting interface according to an example embodiment.

Referring to FIG. 5, a user may click an interface for invoking a registered utterance inputting interface to invoke the registered utterance inputting interface. The registered utterance inputting interface may also be referred to an uttered sentence managing interface or an uttered sentence additional managing interface.

Through the uttered sentence managing interface, the user may directly input a registered utterance including an irregularly registered utterance. To achieve a quality of learning ensuring at least consistency, a preset number or more of registered utterances may need to be input.

Referring to portions 510 through 530 of FIG. 5, at least 20 registered utterances may be needed for learning, and 100 registered utterances may be the recommended number of registered utterances. The portion 510 illustrates a screen of the uttered sentence managing interface in a case in which there is no registered utterance input. The portion 520 illustrates a screen of the uttered sentence managing interface in a case in which 1 to 20 registered utterances are input. The portion 530 illustrates a screen of the uttered sentence managing interface in a case in which more than 20 registered utterances are input.

When a registered utterance is input, a server may dynamically update a first index corresponding to the number of registered utterances for each intention, and show the user an amount of registered utterances input.

For example, the first index may be represented by a status bar corresponding to the number of registered utterances in the uttered sentence managing interface. In addition, all registered utterances input by the user may be indicated in the uttered sentence managing interface, and the registered utterances may be output by being listed up in order of being input in the uttered sentence managing interface.

In addition, referring to the portion 510, when there is no registered utterance input, a storing interface may not be activated, and only an additional upload interface may be activated. Referring to the portion 520, both the storing interface and the additional upload interface may be activated. Referring to the portion 530, when more than 20 registered utterances are input, the storing interface may change to a learn-after-store interface. When the user clicks the learn-after-store interface, registered utterances that have been input up to a current point in time may be stored, and the user may request learning of a corresponding intention based on the input registered utterances.

According to an example embodiment, the user may delete at least a portion of previously registered utterances. When the number of registered utterances left after the at least a portion of the registered utterances is deleted is greater than or equal to a minimum threshold for learning, a learning interface may be activated or an interface that induces additional learning may be provided separately.

Figure 6:
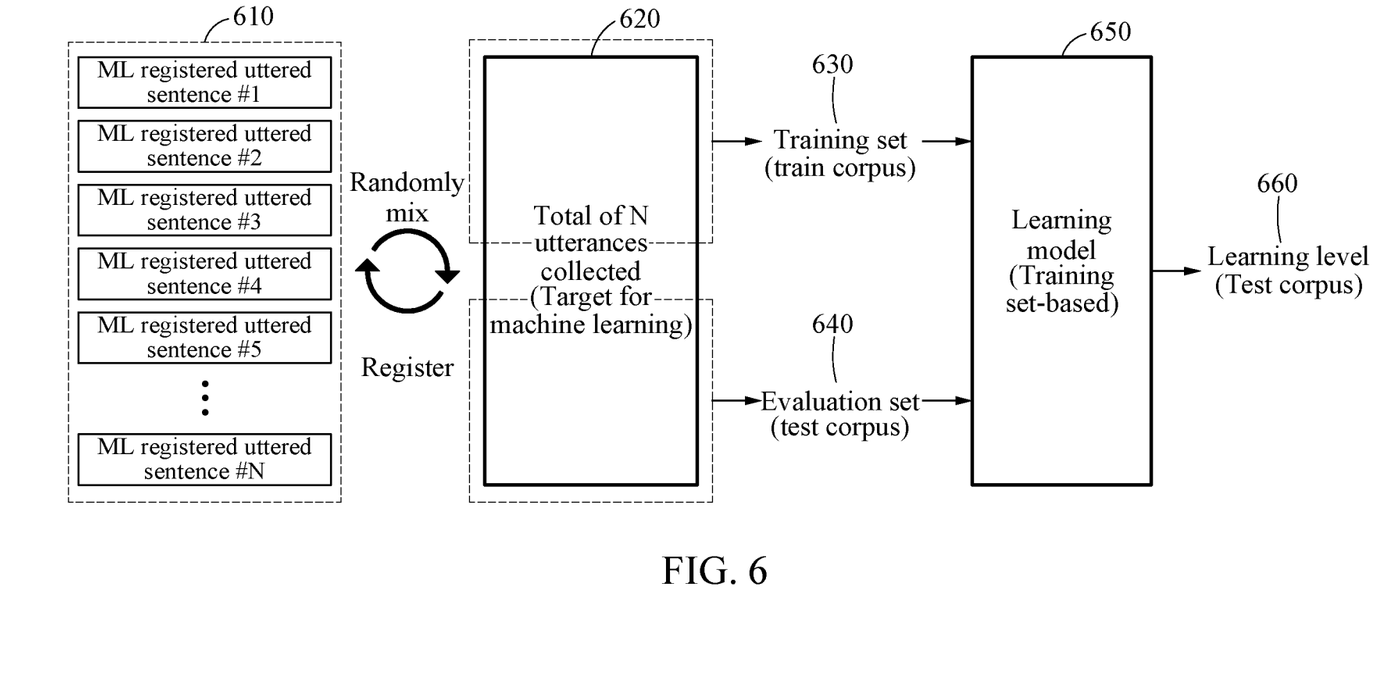
FIG. 6 is a diagram illustrating an example of providing a second index corresponding to a learning level for each intention according to an example embodiment.

FIG. 6 is a diagram illustrating an example of providing a second index corresponding to a learning level for each intention according to an example embodiment.

As described above, since more than a certain number (e.g., 20) of registered utterances needs to be input to achieve a quality of learning ensuring at least consistency, only an intention for which such a certain number or more of registered utterances is input may become a target for which a second index is to be provided in order to evaluate a learning level.

Referring to FIG. 6, ML registered uttered sentence #1 through ML registered uttered sentence #N included in a registered utterance set 610 for each intention may indicate registered utterances corresponding to a certain intention. For example, ML registered uttered sentence #1 through ML registered uttered sentence #N may be registered utterances corresponding to an intention indicating "turn up the volume." The registered utterances may include, for example, "turn up the sound," "isn't the sound too small?," "raise the volume," and "I cannot hear it well, so it would be great if you turn up the sound."

A server may classify the registered utterances included in the registered utterance set 610 into a first registered utterance 630 for learning and a second registered utterance 640 for evaluation. In detail, the server may randomly mix the registered utterances included in the registered utterance set 610, and extract the first registered utterance 630 and the second registered utterance 640 at a certain ratio. For example, the server may extract the first registered utterance 630 and the second registered utterance 640 at a ratio of 4:1 from the registered utterance set 610. The first registered utterance 630 for learning may be a training set used to train a model 650, and the second registered utterance 640 for evaluation may be a test set to be used to evaluate a learning level.

The server may train the model 650 only using the first registered utterance 630, and evaluate the trained model 650 using the second registered utterance 640. In detail, the model 650 may output a result value (between 0 and 1) obtained by determining an intention corresponding to the second registered utterance 640 through a probability distribution-based similarity calculation logic. Here, the server may evaluate whether such an output in response to the second registered utterance 640 corresponds to an intention corresponding to the second registered utterance 640, and extract a result of the evaluating as a learning level 660 indicated by a percentage unit. For example, when 20 registered utterances are extracted as second registered utterances from 100 registered utterances, and an intention for which 15 second registered utterances are learned is output, a 75% learning level may be evaluated. The server may repeat such evaluation a plurality of times to extract a plurality of learning levels, and determine an average value obtained through the repeated evaluation to be the final learning level 660.

According to an example embodiment, a learning level may be evaluated based on whether a result of estimation based on a second registered utterance corresponds to a learned intention. In addition, a learning level for each intention may be evaluated using additional information associated with an output probability indicating that a result of estimation based on a second registered utterance corresponds to a learned intention.

Figure 7:
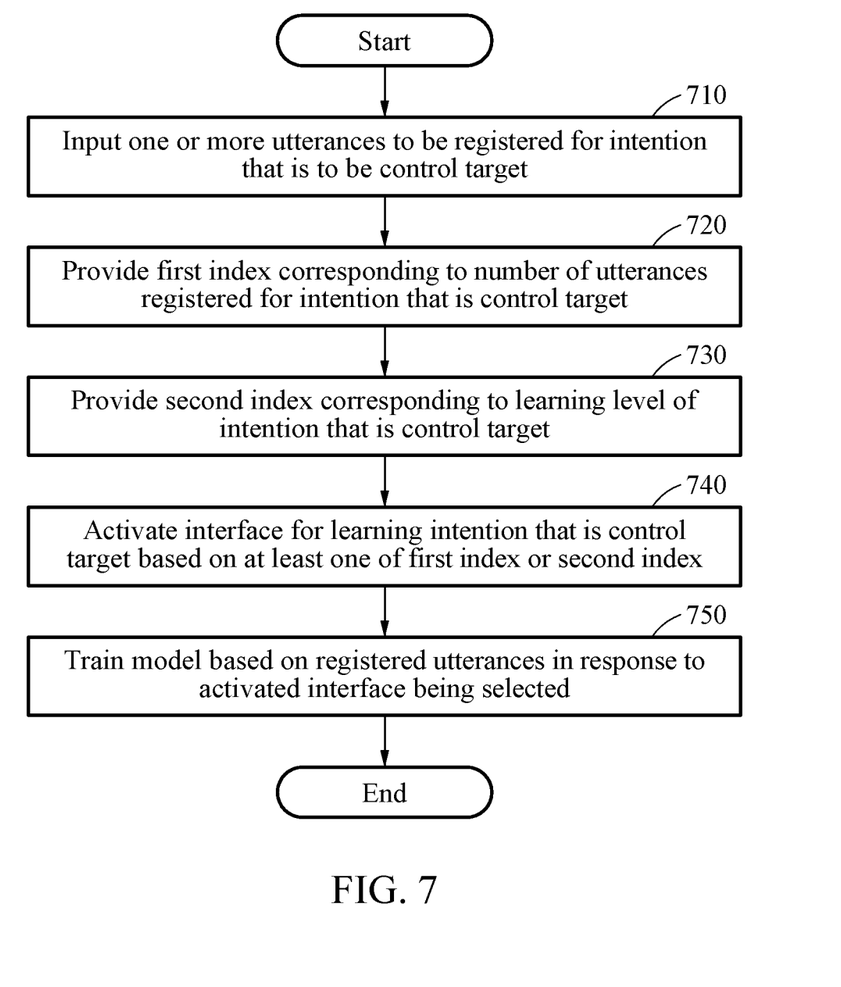
FIG. 7 is a flowchart illustrating an example of a method of controlling, for each intention unit, learning of a model for estimating an intention of an input utterance among a plurality of intentions according to an example embodiment.

FIG. 7 is a flowchart illustrating an example of a method of controlling, for each intention unit, learning of a model for estimating an intention of an input utterance among a plurality of intentions according to an example embodiment.

Operations 710 through 750 to be described hereinafter with reference to FIG. 7 may be included in a method of controlling learning of a model for each intention unit, and performed by the server 130 described above with reference to FIG. 1. What has been described above with reference to FIGS. 1, 2, 5, and 6 may be applied to the example of FIG. 7, and thus a repeated description will be omitted for brevity.

The server 130 may control learning of a model for each intention unit.

Referring to FIG. 7, in operation 710, the server 130 receives, from a user, one or more utterances to be registered for an intention that is a control target. Herein, the control target may refer to a target to be controlled. The server 130 may provide a registered utterance inputting interface that allows an input of utterances, and the user may input an utterance to be registered for an intention that is the control target using the registered utterance inputting interface provided by the server 130.

In operation 720, the server 130 provides a first index corresponding to the number of the utterances registered for the intention that is the control target. In operation 730, the server 130 provides a second index corresponding to a learning level of the intention that is the control target.

In operation 740, the server 130 activates an interface for learning the intention that is the control target based on at least one of the first index or the second index. For example, when the number of the registered utterances is greater than or equal to a threshold value, the server 130 may activate the interface.

In operation 750, when the activated interface is selected, the server 130 trains a model based on the registered utterances. When the user selects the activated interface, the server 130 may train the model based on the registered utterances in response to the activated interface being selected. Hereinafter, a detailed example of the method of controlling the learning of the model for each intention unit will be described with reference to FIG. 8.

Figure 8:
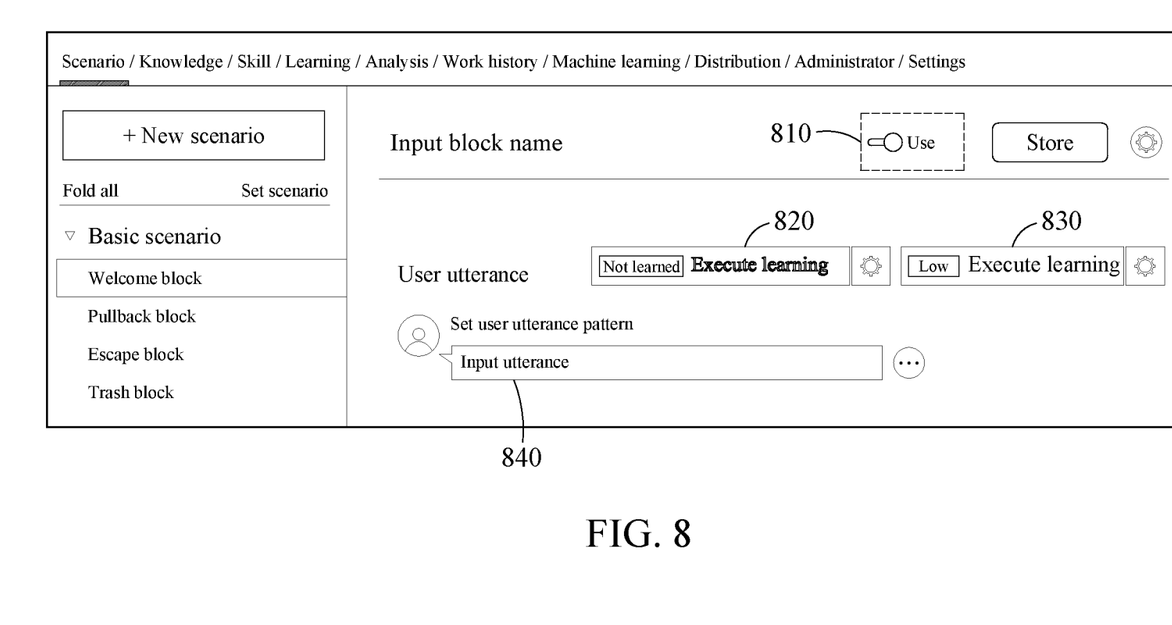
FIG. 8 is a diagram illustrating an example of a screen of a platform that controls, for each intention unit, learning of a model according to an example embodiment.

FIG. 8 is a diagram illustrating an example of a screen of a platform that controls, for each intention unit, learning of a model according to an example embodiment.

Referring to FIG. 8, learning information of an intention that is to be a control target may be verified through visual indices on a screen of a platform, and a user may control learning of the intention that is the control target based on the learning information. The screen of the platform may be related to a welcome block, for example.

A server may provide a learning target setting interface 810. For example, the learning target setting interface 810 may be provided in a form of an on-off switch. In this example, when the switch is in an off state, the intention that is the control target may be automatically excluded from a learning target.

The server may provide a second index corresponding to a learning level for each intention, and an interface for learning the intention that is the control target. For example, when the number of input registered utterances is less than a minimum number of registered utterances required for learning, an interface 820 may be provided and an interface 830 may be omitted. Conversely, when the number of input registered utterances is greater than the minimum number of registered utterances required for learning, the interface 830 may be provided and the interface 820 may be omitted. Referring to the interface 820, when the number of input registered utterances is less than the minimum number of registered utterances required for learning, the second index may indicate a not learned state, an interface for learning the intention that is the control target may be inactivated. Referring to the interface 830, when the number of input registered utterances is greater than the minimum number of registered utterances required for learning, the interface for learning the intention that is the control target may be activated, and the second index may indicate a low state.

The server may provide a registered utterance inputting interface 840 that allows the user to input an utterance to be registered. The description of the registered utterance inputting interface provided above with reference to FIG. 5 may be applicable to the registered utterance inputting interface 840, and thus a more detailed and repeated description will be omitted here for brevity.

Although not illustrated, the server may also provide a first index corresponding to the number of registered utterances for the intention that is the control target.

Although not illustrated, an interface for maintaining a balance between a target intention (or a target block) to be controlled through the screen illustrated in FIG. 8, and other intentions (or other blocks) may be further provided. For example, when the number of registered utterances for a certain intention is considerably greater than the number of registered utterances for other intentions, an overall model performance may be degraded. To prevent such a performance degradation, an interface that induces an adjustment of the number of registered utterances for a target intention or an interface that induces additional learning of a target intention may be additionally provided to the screen illustrated in FIG. 8, based on the number of registered utterances for other intentions or learning levels of the other intentions.

Figure 9:
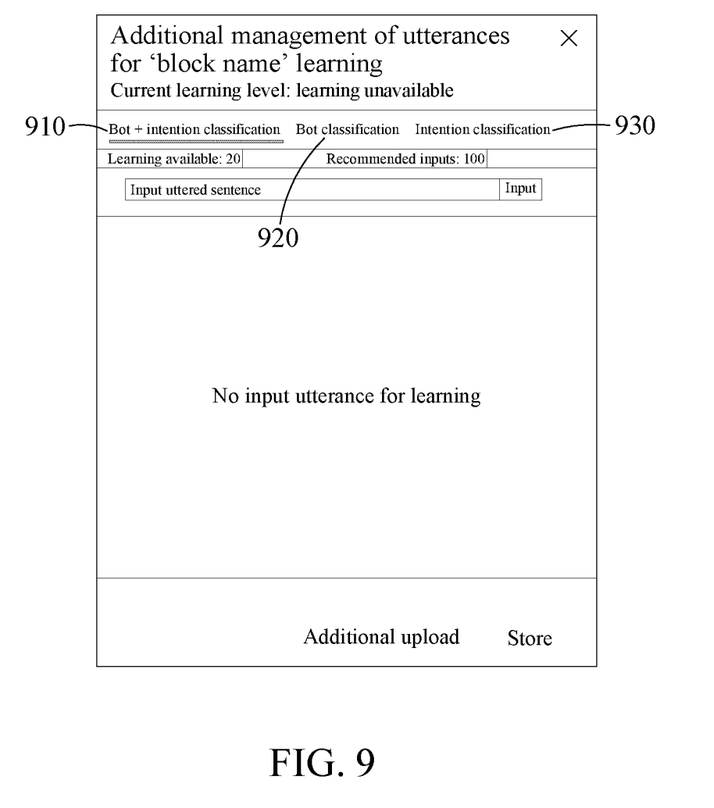
FIG. 9 is a diagram illustrating an example of a classification range of a model according to an example embodiment.

FIG. 9 is a diagram illustrating an example of a classification range of a model according to an example embodiment.

Referring to FIG. 9, a model may perform bot classification and integrated bot and intention classification, in addition to intention classification, based on a learning pattern.

A server may provide an interface 910 for performing the integrated bot and intention classification, an interface 920 for performing the bot classification, and an interface 930 for performing the intention classification.

The bot classification may be used in a single system including a plurality of bots to classify the bots which correspond to a set of various intentions. For example, through the bot classification, it is possible to classify a plurality of bots (upper level of block) having various intentions, instead of one bot unit, by setting a learning space separately classified.

The integrated bot and intention classification may be used to classify bots and intentions flexibly according to a situation by integrating the bots and the intentions.

According to an example embodiment, a server may include a model learning controlling apparatus.

The model learning controlling apparatus may include a processor. The processor may provide a first index corresponding to the number of registered utterances for each intention, provide a second index corresponding to a learning level for each intention, provide a learning target setting interface for each intention such that at least one intention that is to be a learning target is selected from among a plurality of intentions based on the first index and the second index, and train a model based on the registered utterances for each intention and setting of the learning target for each intention.

The processor may provide an interface for invoking a registered utterance inputting interface for each intention. When a registered utterance for each intention is input, the processor may dynamically update the first index. The processor may determine whether the number of registered utterances for each intention is greater than or equal to a threshold value, and provide the first index corresponding to a result of the determining. The processor may classify the registered utterances for each intention into a first registered utterance for learning and a second registered utterance for evaluation. The processor may train the model based on the first registered utterance and the setting of the learning target for each intention. The processor may evaluate the model based on the second registered utterance, and provide the second index based on a result of the evaluating. The processor may input the second registered utterance to the model, and evaluate whether the model outputs an intention corresponding to the second registered utterance.

According to an example embodiment, there is provided an apparatus for controlling, for each intention unit, learning of a model for estimating an intention of an input utterance among a plurality of intentions. The apparatus may include a processor. The processor may receive one or more utterances to be registered for an intention that is a control target to be controlled, provide a first index corresponding to the number of the utterances registered for the intention that is the control target, provide a second index corresponding to a learning level of the intention that is the control target, activate an interface for learning the intention that is the control target based on at least one of the first index or the second index, and train the model based on the registered utterances in response to the activated interface being selected.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of controlling learning of a model for estimating an intention of an input utterance among a plurality of intentions, the method comprising:
   providing a first index for each intention of the plurality of intentions, the first index comprising a number of registered utterances for each of the plurality of intentions;
   providing a second index corresponding to a learning level for each intention;
   providing a learning target setting interface such that at least one intention that is to be a learning target is selected from the plurality of intentions based on the first index and the second index; and
   training the model based on the registered utterances for each intention and setting of the learning target for each intention,
   wherein the providing of the first index comprises:
   in response to a new registered utterance for an intention being input, updating the first index to increase the number of registered utterances for the intention by one.

2. The method of claim 1, further comprising:
   providing an interface for invoking an interface for inputting the registered utterances for each intention.

3. The method of claim 1, wherein the providing of the first index comprises:
   determining whether the number of the registered utterances for each intention is greater than or equal to a threshold value; and
   providing the first index corresponding to a result of the determining.

4. The method of claim 1, further comprising:
   classifying the registered utterances for each intention into a first registered utterance for learning and a second registered utterance for evaluation.

5. The method of claim 1, wherein the training comprises:
   training the model based on a first registered utterance and the setting of the learning target for each intention.

6. The method of claim 1, wherein the providing of the second index comprises:
   evaluating the model based on a second registered utterance; and
   providing the second index based on a result of the evaluating.

7. The method of claim 6, wherein the evaluating of the model comprises:
   determining whether an intention corresponding to the second registered utterance is output after the second registered utterance is input to the model.

8. The method of claim 1, wherein the training comprises:
   training the model through a supervised learning method.

9. The method of claim 1, wherein the registered utterances include at least one of a patterned registered utterance including a combination of previously tagged unit words or an irregularly registered utterance not including the tagged unit words.

10. A non-transitory computer-readable storage medium storing instructions that, when executed by a processor, cause the processor to perform the method of claim 1.

11. A method of controlling, for each intention unit, learning of a model for estimating an intention of an input utterance among a plurality of intentions, the method comprising:
    receiving an input of one or more utterances to be registered for an intention that is a control target to be controlled;
    providing a first index for each intention of the plurality of intentions, the first index comprising a number of the utterances registered for the intention that is the control target;
    providing a second index corresponding to a learning level of the intention that is the control target;
    activating an interface for learning the intention that is the control target based on at least one of the first index or the second index;
    in response to the activated interface being selected, training the model based on the registered utterances, and
    updating the first index to increase the number of registered utterances for the intention based on the input of one or more utterances.

12. The method of claim 11, wherein the activating comprises:
    in response to the number of the registered utterances being greater than or equal to a threshold value, activating the interface.

13. An apparatus for controlling learning of a model for estimating of an intention of an input utterance among a plurality of intentions, the apparatus comprising:
    at least a processor configured to:

provide a first index for each intention of the plurality of intentions, the first index comprising a number of registered utterances for each intention;

provide a second index corresponding to a learning level for each intention;

provide a learning target setting interface such that at least one intention that is to be a learning target is selected from among the intentions based on the first index and the second index; and train the model based on the registered utterances for each intention and setting of the learning target for each intention, in response to a new registered utterance for an intention being input, update the first index to increase the number of registered utterances for the intention by one.

14. The apparatus of claim 13, wherein the processor is configured to:

provide an interface for invoking an interface for inputting the registered utterances for each intention.

15. The apparatus of claim 13, wherein the processor is configured to:

determine whether the number of the registered utterances for each intention is greater than or equal to a threshold value; and provide the first index corresponding to a result of the determining.

16. The apparatus of claim 13, wherein the processor is configured to:

classify the registered utterances for each intention into a first registered utterance for learning and a second registered utterance for evaluation.

17. The apparatus of claim 13, wherein the processor is configured to:

train the model based on a first registered utterance and the setting of the learning target for each intention.

18. The apparatus of claim 13, wherein the processor is configured to:

evaluate the model based on a second registered utterance; and provide the second index based on a result of the evaluating.

* * * * *